H. & A. H. HAYSSEN.
DOUGH WEIGHING AND DIVIDING MACHINE.
APPLICATION FILED MAY 25, 1910.
1,041,278.
Patented Oct. 15, 1912.
3 SHEETS—SHEET 1.
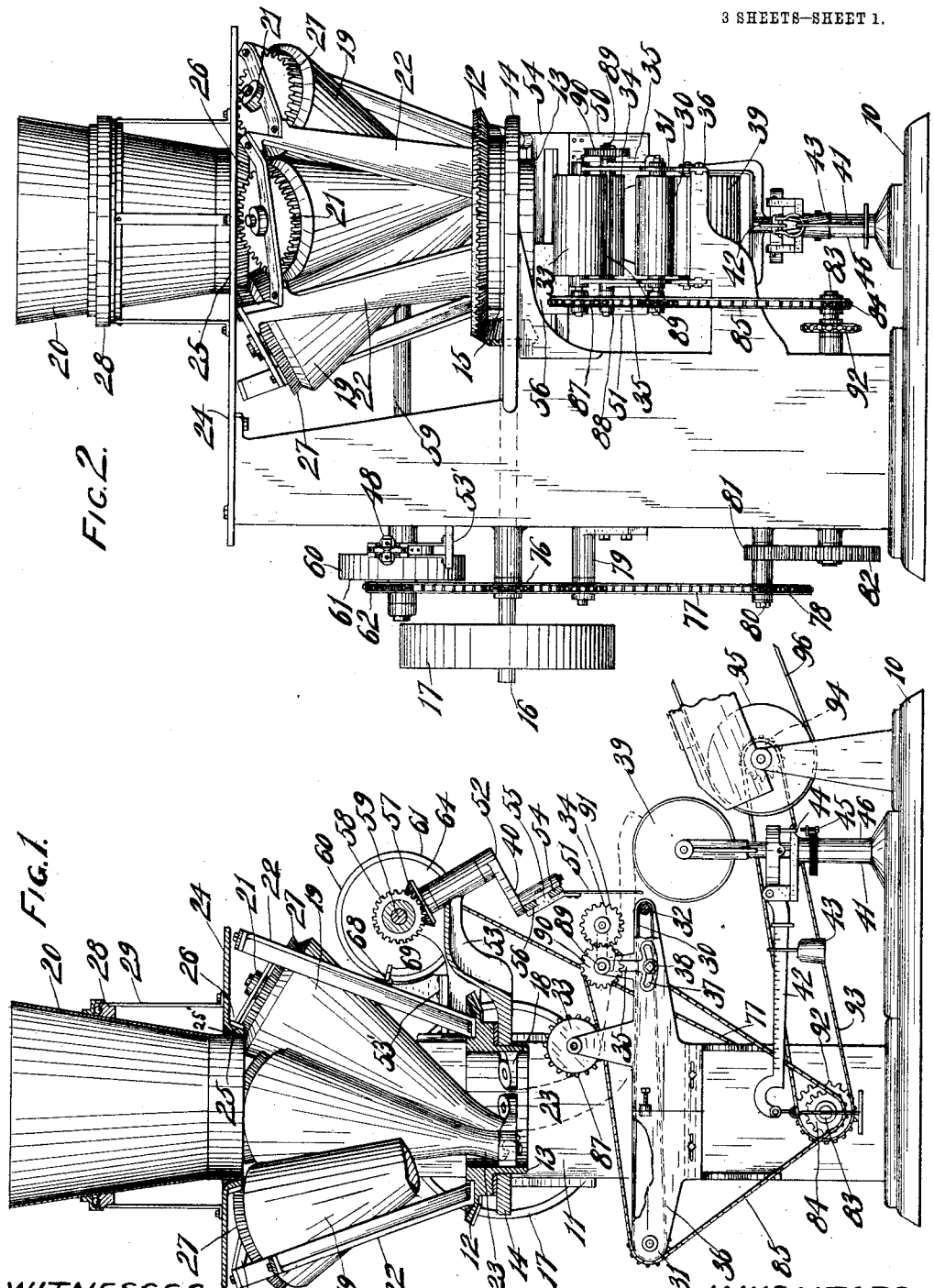

H. & A. H. HAYSSEN.
DOUGH WEIGHING AND DIVIDING MACHINE.
APPLICATION FILED MAY 25, 1910.
1,041,278.
Patented Oct. 15, 1912.
3 SHEETS—SHEET 2.
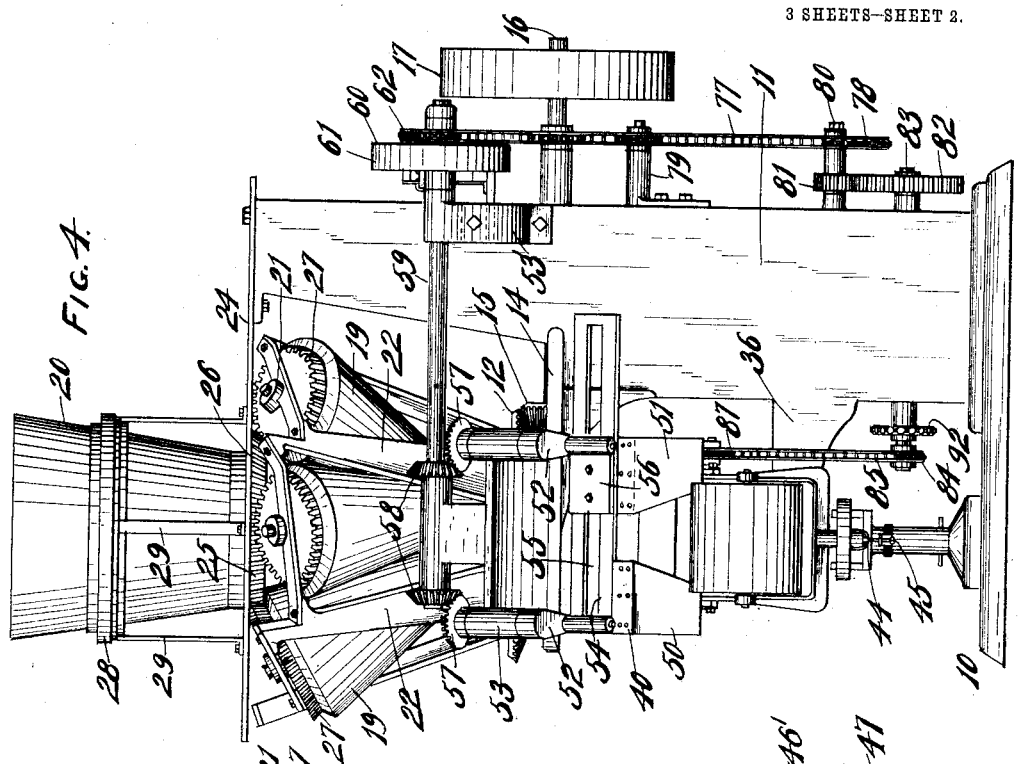
WITNESSES
INVENTORS
ATTORNEYS.

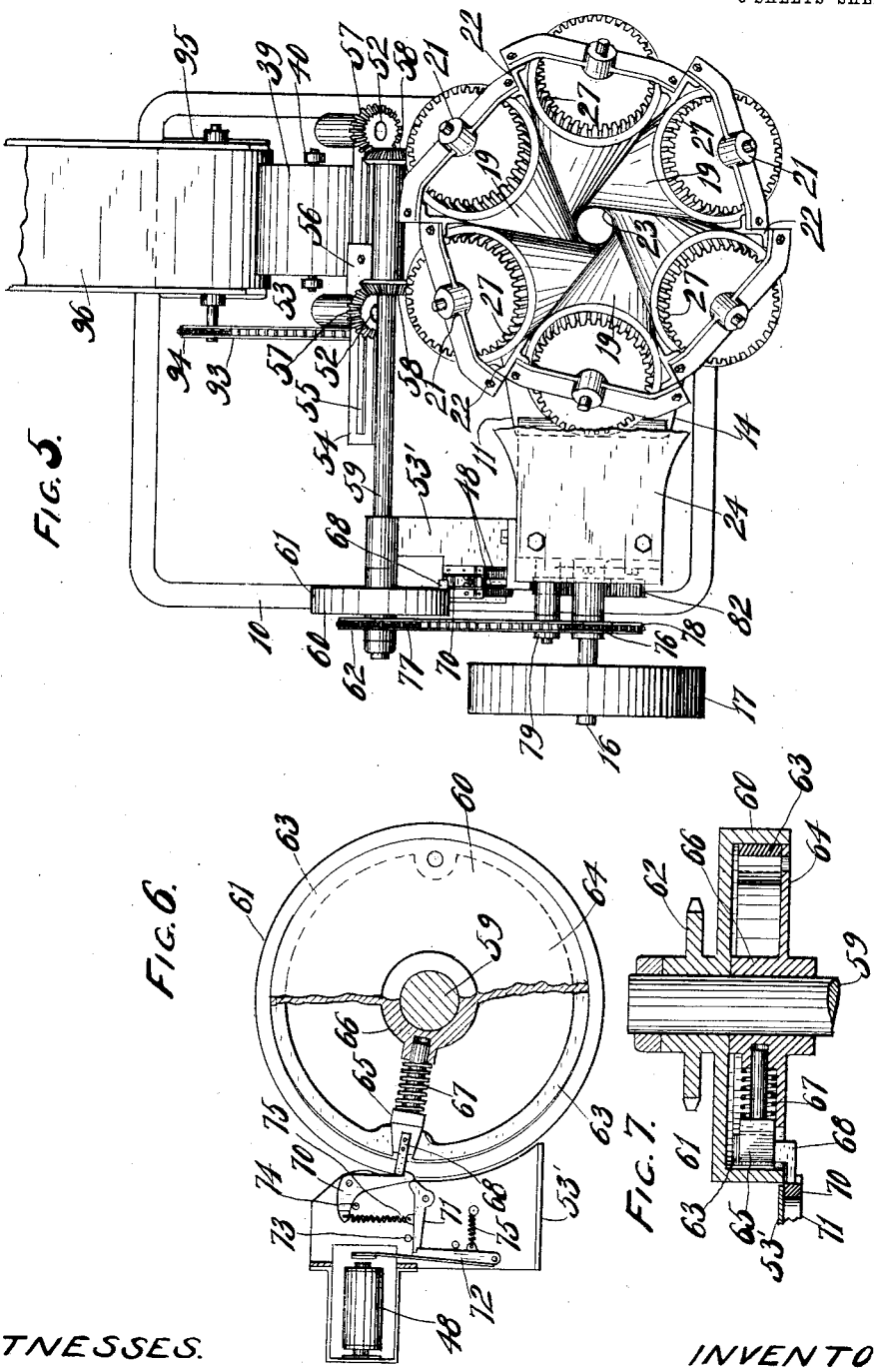

UNITED STATES PATENT OFFICE.

HERMAN HAYSSEN AND ARTHUR H. HAYSSEN, OF SHEBOYGAN, WISCONSIN.

DOUGH WEIGHING AND DIVIDING MACHINE.

1,041,278. Specification of Letters Patent. Patented Oct. 15, 1912.

Application filed May 25, 1910. Serial No. 563,296.

*To all whom it may concern:*

Be it known that we, HERMAN HAYSSEN and ARTHUR H. HAYSSEN, residing in Sheboygan, in the county of Sheboygan and State of Wisconsin, have invented new and useful Improvements in Dough Weighing and Dividing Machines, of which the following is a description, reference being had to the accompanying drawings, which are a part of this specification.

This invention relates to improvements in dough weighing and dividing machines particularly adapted for use in bakeries or other places where large quantities of loaves of bread are baked.

It is the present practice in bakeries to form loaves of bread of a given size, all of a certain weight, and in forming the loaves the bakers estimate and cut the dough into pieces of approximately the weight desired and then place each piece separately on a scale and if the piece is underweight another piece of dough is added to make up the required amount, or if the estimated piece is overweight a portion is removed. While the bakers become quite adept in estimating the size piece to cut to produce a certain weight the operation is necessarily comparatively slow and adds materially to the cost of the bread.

It is one of the objects of this invention to provide a dough weighing and dividing machine which is adapted to automatically weigh and divide a batch of dough into a plurality of pieces of a predetermined weight.

A further object of the invention is to provide a dough weighing and dividing machine which is provided with means for rolling a batch of dough to a certain convenient size and then feeding said rolled dough to a weighing and cutting mechanism which is adapted to weigh and cut the rolled mass into pieces of a given weight.

With the above and other objects in view, the invention consists of a dough weighing and dividing machine and its parts and combinations as set forth in the claims and all equivalents thereof.

In the accompanying drawings in which the same reference characters indicate the same parts in all of the views: Figure 1 is a front view of the improved dough weighing and dividing machine embodying the improvements, the dough rolling portion of the machine being shown in section; Fig. 2 is an end elevation thereof; Fig. 3 is a rear view in elevation of the machine, with the drive wheel removed and the electrical connections shown in diagrammatic form; Fig. 4 is a view in elevation of the opposite end of the machine to that shown in Fig. 2, a part being omitted to show other parts in the rear thereof; Fig. 5 is a top view of the weighing and dividing machine with the upper portion of the machine removed to show parts beneath; Fig. 6 is a detail view of the electrically controlled clutch mechanism; and Fig. 7 is a sectional detail view of some of the parts shown in Fig. 6.

Referring to the drawings the numeral 10 indicates the base portion of the main frame which is provided with a standard 11 upon which is mounted the feeding and dividing mechanism. A bevel gear 12 provided with a tubular hub portion 13 depending therefrom is journaled in a projection 14 extending at an angle forwardly from the standard 11. This bevel gear 12 is driven by means of a bevel pinion 15 carried by the main drive shaft 16 which is journaled on the standard 11 and provided with a belt wheel 17 for belted connection with a source of power.

The bevel gear 12 has extending inwardly therefrom bearing lugs 18 in which are journaled conical feed rollers 19. These feed rollers extend upwardly and outwardly at an angle and form a funnel shaped spout to receive the batch of dough from the revoluble hopper 20 mounted above the said rollers. The upper and larger ends of the feed rollers are journaled in bearings 21 carried by arms 22 extending upwardly from the bevel gear 12. The feed rollers are also positioned at a tangent with relation to the axis of the bevel gear 12 with the lower ends of the rollers extending in advance of the upper ends of said rollers in the direction of rotation of the bevel gear 12. These rollers are formed with slightly enlarged portions 23 so that their adjacent peripheries will just clear each other and form a spout substantially closed on the sides. A hopper plate 24 bolted to the standard 11 and extending over the feed rollers is provided with an opening 25 and a depending annular flange 25′ surrounding said opening and into which extends the lower end of the revoluble hopper 20. The outer periphery of the depending annular flange is provided with gear teeth 26 which are in mesh with gears 27 carried on the upper ends of the feed rollers to cause the rotation of the feed rollers while the said rollers are revolving with the bevel gear 12 thus providing a means for feeding the dough without undue handling or working. The revoluble hopper 20 is supported by and has a ball bearing connection 28 with the hopper plate 24 to permit the free turning of the said hopper by contact with the batch of dough which is being turned by the feed rollers. The ball bearing connection 28 is connected to said hopper plate by means of arms 29 extending upwardly from said plate.

An endless apron 30 positioned beneath the discharge opening of the spout and mounted on rollers 31 and 32 is adapted to receive the dough discharged from the spout in a flexible, cylindrical, continuous stream and carry it to the cutting and weighing mechanism. A guide roll 33 positioned above the endless feed apron serves to guide the dough in proper position on the apron and prevent the apron from drawing the dough at an angle against the side of the discharge end of the spout. A roller 34 adjustably mounted above the feed apron 30 near the end thereof is adapted to flatten the cylindrical stream of dough and regulate the thickness of the mass fed to the cutting mechanism. The adjustable roller is journaled in the outer ends of the upper arms of the bell crank levers 35 mounted on the support 36 of the apron. The lower arms of these bell crank levers are provided with segmental elongated slots 37 through which extend bolts 38 to clamp the ball crank levers to the support and adjust the height of the adjustable roller above the apron. The flattened stream of dough will be carried by the apron to the scale roller 39 positioned adjacent to the end of the apron and moved thereon and when a predetermined amount of dough is resting on the roller the roller will descend and actuate the dividing or cutting mechanism 40 which in turn will divide the flattened portion of dough resting on the roller from the endless mass carried by the apron thus accurately dividing the mass of dough into a plurality of pieces of equal weight.

The scale roller 39 forms the weighing platform of scales 41 which is provided with the usual lever beam 42 and adjustable weight 43 to provide for forming different sized loaves of bread. The short arm of the lever beam 42 is provided with an electrical contact 44 positioned to contact with the fixed contact 45 each time the scale roller is depressed. The fixed contact is connected to and insulated from the scale standard 46. A circuit wire 46' having included in its circuit the scale and the frame of the machine and a battery 47 or other source of electrical energy extends from the fixed contact to a magnet 48 which forms a part of the dividing mechanism.

After the dough has been weighed and cut it passes from the scale roller to an endless conveyer 49 which removes it from the dividing machine.

A pair of reciprocating dough dividing knives 50 and 51 positioned between the discharge end of the apron 30 and the scale roller 39 are adapted to cut and divide the dough passing between said knives. These knives are journaled on the cranked portions of cranked shafts 52 which are mounted on a bracket 53 extending from the side of the projection 14. The knife 50 is connected to a horizontally positioned guide 54 having an elongated slot 55 formed therein and the knife 51 is connected to a slidable member 56 which extends through said slot and has a slidable bearing on each side of the guide so that when the cranked shafts are revolved the knives will be reciprocated toward each other during their cutting stroke and at the same time will advance with the stream of dough in order not to retard the movement of said dough. The upper ends of the cranked shafts carry bevel gears 57 which mesh with bevel gears 58 mounted on a cutter operating shaft 59 journaled on the bracket 53 and on bracket 53' bolted to the standard 11. Mounted on the end of the shaft 59 opposite to the end provided with the bevel gears is an electrically controlled clutch device 60 which is adapted to cause one revolution of the said shaft 59 each time the magnet 48 is energized. This clutch device, which may be of ordinary construction, preferably consists of a clutch wheel 61 having a sprocket chain wheel 62 rigidly connected thereto and both wheels being loosely mounted on the shaft 59. The clutch wheel 61 is flanged circumferentially and a split clutch engaging member 63 positioned within the clutch wheel and pivotally connected to disk member 64 which is fast on the shaft 59 is adapted to be expanded to engage the inner periphery of the clutch wheel and lock the sprocket wheel and the clutch wheel to the shaft 59. The split expansible member is adapted to be expanded to frictionally engage the clutch wheel 61 by means of a wedge block 65 which is slidably mounted in the inner hub of the disk member. A coiled spring 67 surrounding the stem of the wedge block and interposed between the hub and head of the wedge block holds the said wedge block in yielding engagement with the angular faces of the ends of the split expansible member. A stop finger 68 projects from the wedge block 65 through a slot 69 in the disk member 64 and is adapted to engage the shouldered end of the bell-crank stop lever 70 pivotally mounted on the bracket 53'. In engaging the bell crank stop lever the stop finger will be moved away therefrom and cause a like movement of the wedge block and disengage the split band from the clutch wheel. A trip bell crank lever 71 also pivotally mounted on the bracket 53' is positioned so that its short arm will bear against the shouldered lower portion of the bell crank stop lever 70 and its long arm is adapted to rest on the shouldered portion of the pivoted armature 72 of the magnet 48 when said magnet is deenergized. Stop pins 73 and 74 serve to limit the movement of the bell crank levers in one direction and a coiled spring 75 connected to both levers hold the levers yieldingly in position against the stop pins. In the position shown in Fig. 6 the wedge block is forced inwardly against the tension of its spring by the bell crank stop lever and the split expansible member has sprung out of operative engagement with the clutch wheel. The trip bell crank lever which is bearing against the rear portion of the lower arm of the stop lever prevents said stop lever from being moved rearwardly unless the long arm of the trip lever is released from engagement with the shoulder of the armature. When thus released the stop lever will swing the trip lever, and the wedge block will move outwardly and expand the split expansible member and the shaft 59 will be turned one complete revolution when the stop finger 68 will again engage the bell crank stop lever and disengage the split expansible member from the clutch wheel and the shaft 59 will stop and remain at rest until the magnet is again energized. A coiled spring 75 connected to the armature 72 and the bracket 53' serves to normally hold the armature out of engagement with the magnet.

Motion may be transmitted from the drive shaft 16 to the moving parts of the machine in many different ways but is preferably transmitted by chain and gear drive which will now be specifically explained. The drive shaft 16 is provided with a sprocket 76 and a sprocket chain 77 extends from said sprocket to and around the sprocket 62 and thence to and around a sprocket 78 and back to the sprocket of the drive shaft. A chain tightener 79 is adapted to take up slack in said chain due to wear. The sprocket 78 is journaled on a short stud shaft 80 projecting from the standard 11 and has a rigid connection with a pinion 81 mounted on the same shaft. This pinion 81 is in mesh with a gear 82 mounted on a shaft 83 which extends through the standard 11 and is provided on its opposite end with a sprocket 84. A sprocket chain 85 engaged by this sprocket extends to and around a sprocket 86 mounted on the shaft of the apron roller 31 and then extends to and engages a sprocket 87 mounted on the shaft of the guide roller 33. From the sprocket 87 it extends to and around a sprocket 88 mounted on a shaft 89 journaled on the support 36 and then back to the sprocket 84. The shaft 89 on one end is provided with a gear 90 which meshes with a gear 91 mounted on the shaft of the adjustable roller 34. Another sprocket 92 is mounted on the shaft 83 and a sprocket chain 93 extends from this sprocket to and around a sprocket wheel 94 mounted on the shaft of a roller 95 carrying an endless apron 96 for removing the divided dough from the scale roller.

In the operation of the machine a batch of dough is placed in the hopper and in the spout and the revoluble cone shaped members forming the walls of the spout will converge and draw the dough downwardly due to their angular and tangential position with relation to axis of the spout. The dough will be discharged from the spout in a continuous stream cylindrical in form and will fall and lie prone upon the moving apron. The apron will carry the continuous stream of dough forwardly and in moving forward the dough will pass beneath the guide roller and the adjustable roller and be flattened thereby and then moved off the end of the apron and between the dividing knives and on the scale roller. As soon as the amount of dough resting on the scale roller equals the amount the scale has been adjusted to weigh the short arm of the scale beam will be depressed and an electrical contact will be made between the two contacts. This electrical contact will complete the circuit and energize the clutch magnet causing it to actuate its armature and release the bell crank trip lever. The releasing of the trip lever will permit the wedge block carried by the disk member to move outwardly and expand the split expansible member causing it to grip the clutch wheel. The continuously rotated clutch wheel which is loosely mounted on the cutter operating shaft will then transmit its motion to the cutter shaft causing the rotation of said shaft and the rotation of the cranked shafts geared thereto. This movement will reciprocate the knives toward each other with a shearing cut and divide the continuous stream of dough passing therebetween. The knives in cutting the dough will move in the same direction with a quick movement and throw the cut piece of dough on to the endless apron and will then return to their normal position on each side of the feed apron. As soon as the scale roller is relieved of the weight of the cut piece of dough it will rise to its normal position and break the electrical connection between the contacts and the magnet becomes deënergized and its armature is retrieved by its spring. As soon as the stop finger of the wedge block has become disengaged from the bell crank stop lever, this lever and the bell crank trip lever will be retrieved to their normal position by the spring connected thereto and when the disk member has made one revolution the stop finger of the wedge block will engage the bell crank stop lever and the wedge block will be forced inwardly and the expansible member will contract and become disengaged from the clutch wheel. When the member is thus disengaged the stop finger will rest on the shoulder of the bell crank stop lever and the dividing mechanism will be at rest and in position to be again actuated when the scale roller is again depressed by the weight of the stream of dough.

From the above description it will be seen that the dough weighing and dividing machine is simple in construction and operation and is well adapted to perform the function desired.

It is to be understood that this invention is not limited to any specific form or arrangement of parts except in so far as such limitations are specified in the claims.

What we claim as our invention is:

1. A dough weighing and dividing machine, comprising means for feeding dough in a continuous stream, a scale in the path of movement of said stream of dough, dough dividing means positioned to divide the stream of dough after a portion has been weighed on the scale and said dividing means constructed to travel with said dough at approximately the same speed of travel as the dough while dividing the same, and means actuated by the portion of the dough resting on the scale for causing the operation of the dough dividing means.

2. A dough weighing and dividing machine, comprising means for feeding dough in a continuous stream, an endless apron positioned below the feeding means for receiving said dough, a scale provided with a roller positioned adjacent to the end of the apron and over which the stream of dough is moved, dough dividing knives positioned to divide a portion from the stream of dough after said portion has been weighed on the scale and said knives constructed to travel with the dough at approximately the same speed of travel as the dough while dividing the same, and means including an electric circuit and actuated by the weight of the portion of the dough resting on the scale for causing the operation of the dough dividing means.

3. A dough weighing and dividing machine, comprising means for feeding dough in a continuous stream, an endless apron positioned below the feeding means for receiving said dough, a scale provided with a roller positioned adjacent to the end of the apron and over which the stream of dough is moved, dough dividing knives positioned between the scale and the end of the endless apron and arranged to divide a portion of the dough from the stream of dough after said portion has been weighed on the scale, cranked shafts upon which said knives are mounted for moving the knives to cut the dough and to move said knives with the dough at approximately the same speed of travel as the dough during the cutting operation, and means including an electric circuit and actuated by the weight of the portion of the dough resting on the scale for causing the rotation of the cranked shafts and the movement of the knives to sever the weighed portion of dough from the stream of dough.

4. A dough weighing and dividing machine, comprising means for feeding dough in a continuous stream, and an endless apron positioned below the feeding means and upon which the dough is fed, means for regulating the thickness of the dough carried by the apron, a scale positioned adjacent to the end of the endless apron and over which the stream of dough is moved, dough dividing knives positioned between the scale and the endless apron and arranged to divide a portion of the dough from the stream of dough after said portion has been weighed on the scale, cranked shafts upon which said knives are mounted for moving the knives to cut the dough and to move the knives with the dough at approximately the same speed of travel as the dough during the cutting operation, a shaft having a geared connection with the cranked shafts, a clutch mechanism for controlling the rotation of said shaft, and means including an electric circuit and actuated by the weight of the portion of the dough resting on the scale for causing the engagement of the clutch with the shaft and the rotation of the cranked shafts to sever the weighed portion of dough from the stream of dough.

5. A dough weighing and dividing machine, comprising a frame provided with a standard, means for feeding dough in a continuous stream mounted on the standard, an endless apron positioned below the feed means, a guide roller positioned above the apron, an adjustable roller positioned above the apron, a scale positioned adjacent to one end of the apron, a horizontal shaft journaled on the standard and provided with bevel gears, cranked shafts journaled on the standard and provided with bevel gears in mesh with the horizontal shaft gears, a slotted member journaled on the cranked portion of one of the cranked shafts and having a knife rigidly connected thereto, a member journaled on the cranked portion of the other cranked shaft and having a sliding connection with the slotted member and also provided with a knife, a clutch mounted on the horizontal shaft, magnetic means controlling the operation of the clutch, and means actuated by a movement of the scale for controlling the operation of the magnet.

6. A dough weighing and dividing machine, comprising means for feeding dough in a continuous stream, a scale positioned to weigh the dough discharged from the dough feeding means, dough dividing means located to sever a weighed portion of dough from the portion unweighed, a clutch mechanism constructed to transmit motion to the dividing means to cause it to sever one portion of dough from the major portion each time it is operated, a magnetic means controlling the operation of the clutch mechanism, and electrical means actuated by the movement of the scale in weighing a portion of the dough for controlling the magnetic means.

7. A dough weighing and dividing machine, comprising means for feeding the dough in a continuous stream, a scale positioned to weigh the dough discharged from the feeding means, dough dividing means located to sever a weighed portion of dough from the portion unweighed, a clutch mechanism constructed to transmit motion to the dividing means to cause it to sever one portion of dough from the major portion each time it is operated, said clutch mechanism consisting of a continuously rotated member and a member constructed to intermittently engage the continuously rotated member, a magnetic means controlling the operation of the intermittent member, and electrical means actuated by the movement of the scale in weighing a portion of the dough for controlling the magnetic means.

In testimony whereof, we affix our signatures, in presence of two witnesses.

HERMAN HAYSSEN.
ARTHUR H. HAYSSEN.

Witnesses:
ARTHUR IMIG,
M. J. KWEKKEBOOM.

Copies of this patent may be obtained for five cents each, by addressing the "Commissioner of Patents, Washington, D. C."